US012594724B2

(12) United States Patent
El Ouazzani Tayibi et al.

(10) Patent No.: US 12,594,724 B2
(45) **Date of Patent: \*Apr. 7, 2026**

(54) MODULE FOR SUPPLYING ADDITIVE MANUFACTURING POWDER ALLOWING DRYING OF THE POWDER

(71) Applicant: AddUp, Cebazat (FR)

(72) Inventors: Ali El Ouazzani Tayibi, Cebazat (FR); Ludovic Angele, Cebazat (FR)

(73) Assignee: ADDUP, Cebazat (FR)

( * ) Notice: Subject to any disclaimer, the term of this patent is extended or adjusted under 35 U.S.C. 154(b) by 995 days.

This patent is subject to a terminal disclaimer.

(21) Appl. No.: 17/777,842

(22) PCT Filed: Nov. 17, 2020

(86) PCT No.: PCT/FR2020/052099
§ 371 (c)(1),
(2) Date: May 18, 2022

(87) PCT Pub. No.: WO2021/099728
PCT Pub. Date: May 27, 2021

(65) Prior Publication Data
US 2022/0410259 A1     Dec. 29, 2022

(30) Foreign Application Priority Data

Nov. 18, 2019    (FR) ...................................... 1912852

(51) Int. Cl.
*B29C 64/329*        (2017.01)
*B22F 1/14*          (2022.01)
(Continued)

(52) U.S. Cl.
CPC .............. *B29C 64/329* (2017.08); *B22F 1/14* (2022.01); *B22F 10/00* (2021.01); *B22F 10/10* (2021.01);
(Continued)

(58) Field of Classification Search
CPC ..... B29C 64/357; B29C 64/329; B22F 10/70; B22F 10/00; B22F 10/10; B22F 10/34;
(Continued)

(56) References Cited

U.S. PATENT DOCUMENTS 10,773,306 B2    9/2020   Nicaise
10,960,467 B2    3/2021   Golz et al.
(Continued)

FOREIGN PATENT DOCUMENTS

CN        100579689 C     1/2010
CN        204413155 U     6/2015
(Continued)

OTHER PUBLICATIONS

International Search Report dated Jan. 21, 2021, in corresponding PCT/FR2020/052099 (4 pages).

*Primary Examiner* — Ariella Machness
(74) *Attorney, Agent, or Firm* — VENABLE LLP

(57) ABSTRACT

A supply module (2) for supplying additive manufacturing powder comprises: a main hopper (29) for storing additive manufacturing powder, the main hopper (29) being designed to be connected to a manufacturing module (4) configured to additively manufacture an object from the powder; an inlet (211) of the supply module (2) designed to be connected to the manufacturing module (4) and to receive powder located in the manufacturing module (4); a glovebox (25) being able to be closed in a sealed manner; a provisioning circuit configured to transfer powder located in the glovebox (25) to the main hopper (29); and a circulation system designed to set powder in motion according to a circulation loop closed on itself, the circulation system comprising a suction system (21) designed to evacuate gas present in the circulation loop, the circulation loop passing through the main hopper (29) and the suction system (21).

13 Claims, 2 Drawing Sheets

(51) Int. Cl.

| | |
|---|---|
| *B22F 10/00* | (2021.01) |
| *B22F 10/10* | (2021.01) |
| *B22F 10/34* | (2021.01) |
| *B22F 10/73* | (2021.01) |
| *B22F 12/00* | (2021.01) |
| *B22F 12/52* | (2021.01) |
| *B22F 12/57* | (2021.01) |
| *B22F 12/70* | (2021.01) |
| *B22F 12/90* | (2021.01) |
| *B33Y 30/00* | (2015.01) |
| *B33Y 40/10* | (2020.01) |

(52) U.S. Cl.
CPC .............. *B22F 10/34* (2021.01); *B22F 10/73* (2021.01); *B22F 12/52* (2021.01); *B22F 12/70* (2021.01); *B22F 12/90* (2021.01); *B33Y 30/00* (2014.12); *B33Y 40/10* (2020.01); *B22F 12/38* (2021.01); *B22F 12/57* (2021.01); *B22F 2201/10* (2013.01)

(58) Field of Classification Search
CPC .......... B22F 10/73; B22F 12/52; B22F 12/70; B22F 12/90; B22F 1/14
See application file for complete search history.

(56) References Cited

U.S. PATENT DOCUMENTS

| | | | |
|---|---|---|---|
| 11,040,400 | B2 | 6/2021 | Effernelli et al. |
| 2017/0028468 | A1 | 2/2017 | Dellea et al. |
| 2018/0021855 | A1* | 1/2018 | De Lajudie ............ B33Y 10/00 |
| | | | 419/26 |
| 2019/0001413 | A1 | 1/2019 | Golz et al. |
| 2019/0009334 | A1 | 1/2019 | Effernelli et al. |
| 2019/0009336 | A1 | 1/2019 | Nicaise |
| 2019/0126346 | A1* | 5/2019 | Graichen ................ B22F 3/003 |
| 2021/0069987 | A1* | 3/2021 | Roman ................... B29C 64/10 |
| 2021/0121916 | A1 | 4/2021 | Charlebois et al. |
| 2021/0162507 | A1 | 6/2021 | Eyermann et al. |
| 2021/0291448 | A1 | 9/2021 | Swier et al. |
| 2021/0394241 | A1* | 12/2021 | Radermacher ........ B08B 15/002 |
| 2022/0402037 | A1* | 12/2022 | Blaser ..................... B22F 12/38 |
| 2022/0410479 | A1 | 12/2022 | El Ouazzani Tayibi |

FOREIGN PATENT DOCUMENTS

| | | | |
|---|---|---|---|
| CN | 108367353 | A | 8/2018 |
| CN | 108438316 | A | 8/2018 |
| CN | 108971492 | A | 12/2018 |
| CN | 109153145 | A | 1/2019 |
| CN | 109803776 | A | 5/2019 |
| CN | 110202789 | A | 9/2019 |
| DE | 10 2015 010 390 | A1 | 2/2017 |
| EP | 3539695 | A1 | 9/2019 |
| FR | 299315 | A1 | 1/2014 |
| JP | 2018-103462 | A | 7/2018 |
| WO | 2017/194387 | A1 | 11/2017 |
| WO | 2018/087087 | A1 | 5/2018 |
| WO | 2019/070277 | A1 | 4/2019 |

* cited by examiner

P

| Circulate the powder in the circulation loop using the circulation system | E1 |

| Measure the level of humidity in the circulation loop | E2 |

| Compare the measured level of humidity against a threshold level | E3 |

| Sieve the powder put into circulation | E4 |

| Stop the circulation according to the result of the comparison step (E3) | E5 |

MODULE FOR SUPPLYING ADDITIVE MANUFACTURING POWDER ALLOWING DRYING OF THE POWDER

FIELD OF THE INVENTION

The present invention relates to the general field of additive manufacturing machines and more particularly to the field of powder drying in additive manufacturing machines.

PRIOR ART

Selective additive manufacturing consists in creating three-dimensional objects by consolidating selected areas in successive layers of pulverulent material (metal powder, ceramic powder, etc.).

If the additive manufacturing powder loaded into the additive manufacturing machine has a high level of humidity, the parts made from this powder are of lower quality and more often have defects.

For this purpose, an additive manufacturing machine may include a drying system. Conventionally drying systems include heating elements for raising the temperature of the powder. There are also vacuum draw systems for extracting moisture from the powder. Another solution consists in using mechanical elements suitable for immersing inside a reservoir containing powder so as to agitate or stir the latter. These different solutions can be implemented individually or collectively. These different solutions do not have sufficient efficiency or else significantly disturb the correct operation of the additive manufacturing machine.

SUMMARY OF THE INVENTION

An object of the invention is to propose an additive manufacturing machine which makes it possible to dry powder more efficiently without disturbing the correct operation of the additive manufacturing machine.

The object is achieved within the context of the present invention by virtue of a module for supplying additive manufacturing powder, comprising a main hopper for storing additive manufacturing powder, the main hopper being designed to be connected to a manufacturing module configured to additively manufacture an object from the powder located in the main hopper, an inlet of the supply module, which inlet is designed to be connected to the manufacturing module and to receive powder located in the manufacturing module, a glovebox designed to receive a container, the glovebox being able to be closed in a sealed manner, a provisioning circuit configured to transfer powder located in the glovebox to the main hopper, a circulation system designed to set powder in motion according to a circulation loop closed on itself, the circulation system comprising a suction system remote from the main hopper, the suction system being designed to evacuate gas present in the circulation loop, the circulation loop passing through the main hopper and the suction system.

On the one hand, the circulation system which makes it possible to set damp powder in motion and on the other hand the suction system which makes it possible to suck moisture from the gaseous environment of the powder make it possible overall to dry the powder more quickly and more effectively. No mobile mechanical element, such as for example a mixer, immersed inside a reservoir containing powder is used, and this means that the drying means do not disturb the correct operation of the additive manufacturing machine. Such a device is advantageously supplemented by the following various features or steps considered on their own or in combination:

the circulation loop includes a reservoir located below the main hopper and comprising an outlet designed to be connected to the manufacturing module by a manufacturing conduit, a return circuit configured to redirect additive manufacturing powder located in the reservoir towards the inlet of the supply module, the circulation system being designed to suck powder from the outlet of the reservoir towards the inlet of the supply module, a dry inert gas supply system designed to supply the circulation loop with dry inert gas below the main hopper, a moisture sensor designed to measure the level of humidity in the circulation loop, a sieve located above the reservoir, the powder passing through the circulation loop successively passes through the main hopper, the sieve, the reservoir, the return circuit and the suction system, a first moisture sensor being designed to measure the level of humidity in the main hopper, a second moisture sensor placed on a gas evacuation circuit of the suction system and a third moisture sensor connected to the dry inert gas supply system, an extraction circuit different from the provisioning circuit and configured to transfer to the container, when the container is received in the glovebox, additive manufacturing powder from the inlet of the supply module, the extraction circuit comprising a diverter, a bypass circuit connecting the diverter to the reservoir and designed to transfer powder directly from the diverter to the reservoir, the diverter being configurable into an extraction configuration, in which additive powder coming from the inlet of the supply module is redirected selectively towards the glovebox, a loopback configuration, in which additive powder coming from the inlet of the supply module is redirected selectively into the bypass circuit, the diverter being configured in the loopback configuration when the circulation system is moving powder from the outlet of the reservoir towards the inlet of the manufacturing module.

The invention also relates to an additive manufacturing device comprising a supply module for supplying additive manufacturing powder as set out hereinabove, and a manufacturing module configured to additively manufacture an object from the powder located in the main hopper, the main hopper being connected to the manufacturing module and the inlet of the supply module being connected to the manufacturing module.

Advantageously, but optionally, the manufacturing module of the device may be supplemented by a recovery system for recovering powder that is not consolidated when the object is being additively manufactured and for redirecting the powder recovered to the inlet of the supply module.

The invention also relates to a method for drying additive manufacturing powder using a supply module as set out hereinabove and comprising, when powder is present in the main hopper, a step of circulating the powder in the circulation loop using the circulation system.

Advantageously, but optionally, the method may be supplemented by the following various steps taken alone or in combination:

a step of measuring the level of humidity in the circulation loop, a step of comparing the measured level of humidity against a threshold level, a step of stopping the circulation of the powder, the step of stopping the circulation being implemented according to the result of the comparison step; a step of sieving the powder put into circulation.

DESCRIPTION OF THE FIGURES

Further features and advantages of the invention will become more apparent from the following description, which is purely illustrative and non-limiting and should be read in conjunction with the appended drawings, in which.

DETAILED DESCRIPTION OF THE INVENTION

Figure 1:
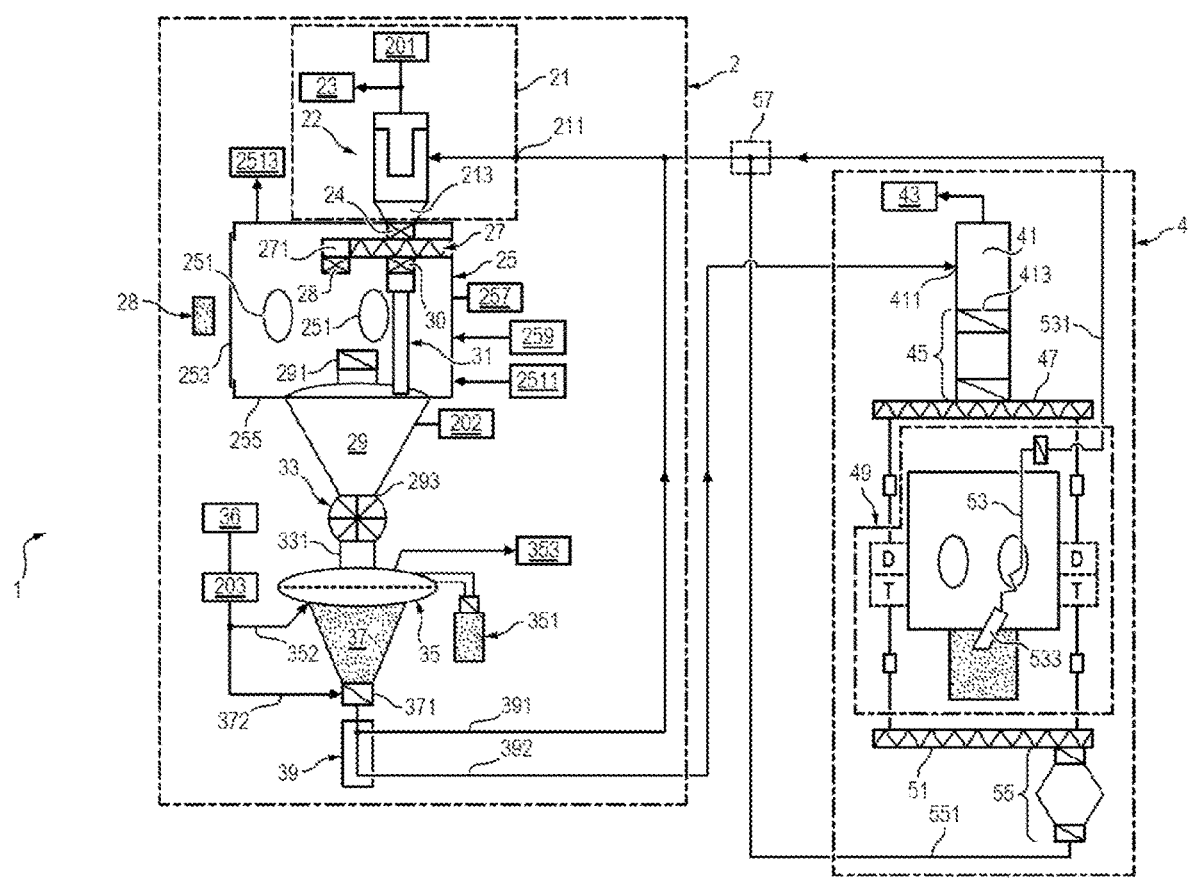
FIG. 1 is a schematic representation of an additive manufacturing machine according to one embodiment of the invention.
Figure 2:
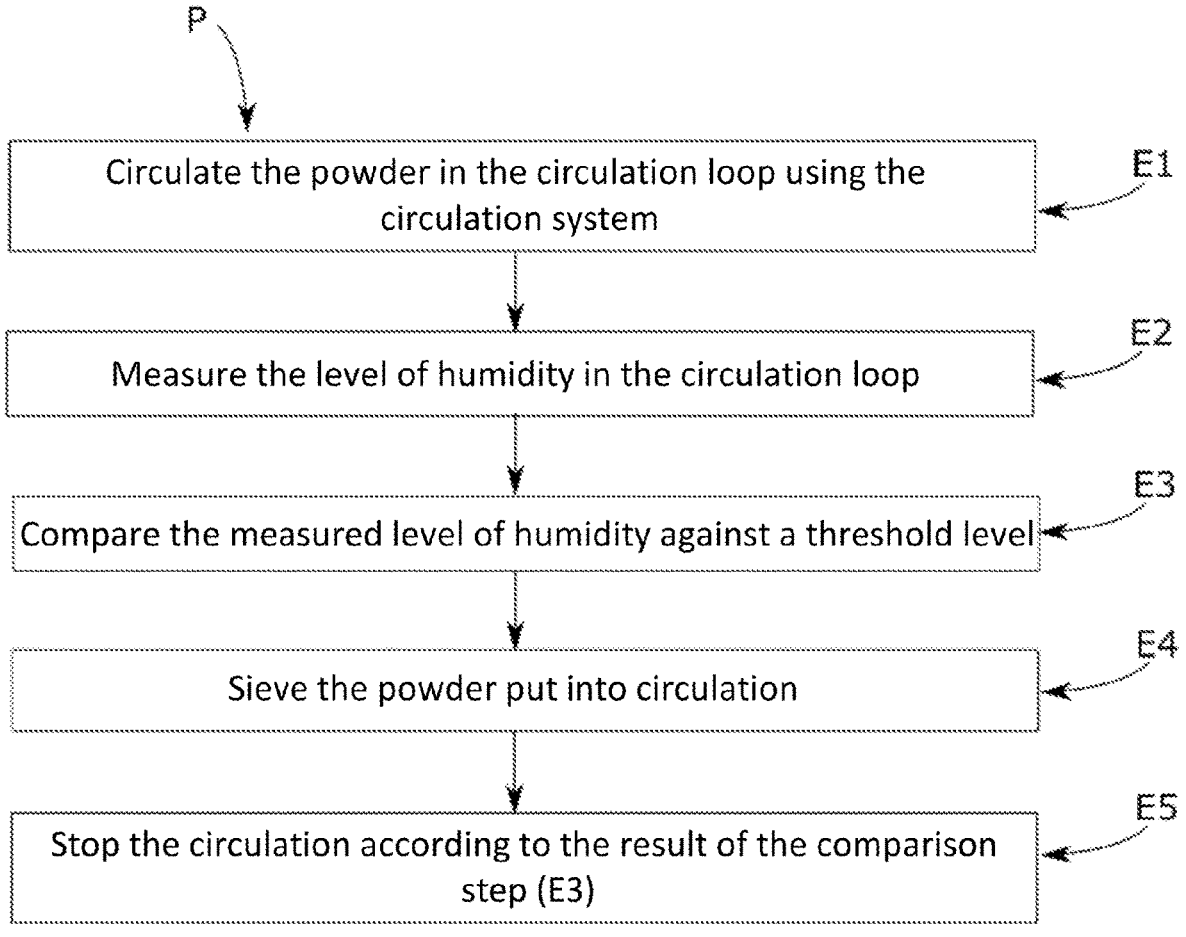
FIG. 2 is a schematic representation of an additive manufacturing powder drying method according to one embodiment of the invention.

FIG. 1 shows an additive manufacturing device 1 comprising a powder supply module 2 and a manufacturing module 4.

Supply Module

In its upper part, the supply module 2 comprises a suction system 21 connected to a first gas discharging circuit 23. The suction system 21 has an inlet 211 and an outlet 213 that is located at the bottom of the suction system 21. The suction system 21 is designed to generate a suction force at the inlet 211 that is directed towards the inside of the suction system 21. The first gas discharging circuit 23 may comprise a vacuum pump for generating the suction force. The suction system 21 is designed to receive additive manufacturing powder from the inlet 211 and to store it. The stored powder is located at the bottom of the suction system 21 and can be extracted via the outlet 213. The suction system 21 may comprise a powder filter so that the powder does not enter the first discharging circuit 23. The suction system 21 comprises a device which makes it possible to separate the powder from the gas, such as for example a cyclofilter 22. Other devices for separating the powder from the gas do exist, such as a filter chamber comprising filters, a cyclone or a discharge box.

The supply module 2 comprises a housing 25 located below the suction system 21. The housing 25 comprises various walls that define a chamber. The housing 25 may be closed such that the chamber is a volume that is hermetically sealed with respect to the outside of the device. The housing is designed such that objects located inside the housing can be moved and handled. In particular, the housing comprises instruments for moving and handling objects inside the chamber while the chamber is closed.

The housing 25 may in particular be a glovebox. In this case, the housing has two orifices in which gloves 251 are provided such that the fluidtightness of the housing is preserved. The gloves 251 are instruments for moving and handling objects inside the chamber while the chamber is closed. By putting on the gloves 251, an operator can handle objects located inside the glovebox 25 from outside the glovebox. One wall of the glovebox may be transparent in order to allow the operator to observe the objects to be handled.

In particular, the objects may be containers or pots 28 designed to contain additive manufacturing powder. The containers and the pots may be closed by lids.

The instruments of the housing are designed for moving and closing containers or pots 28 inside the chamber while the chamber is closed.

One of the walls of the housing 25 has a first door 253. The first door 253 is movable between an open position, in which a container can be moved from outside the device into the chamber or from the chamber to outside the device, and a closed position, in which the chamber is separated from the outside of the device in a sealed manner. The first door 253 can be closed in such a way that the housing is hermetically separated from the outside. It is also possible to move lids in or out so as to close the containers or the pots.

The housing 25 may comprise a transit area 255 within which one or more containers can be temporarily stored and stacked.

The housing 25 may comprise an oxygen sensor 257. The sensor 257 is designed to measure the oxygen fraction inside the housing.

The housing 25 may comprise a supply circuit 259 for supplying air and a supply circuit 2511 for supplying inert gas. The inert gas may in particular be dinitrogen or argon.

The housing 25 may comprise a second gas discharging circuit 2513 which may comprise a vacuum pump for generating the suction force.

The assembly of the supply circuit 259 for supplying air, the supply circuit 2511 for supplying inert gas and the second gas discharging circuit 2513 defines a gas stream control system which makes it possible to control the oxygen fraction and the inert gas fraction in the chamber.

The supply module 2 comprises a metering system 27 located below the suction system 21. The metering system 27 is connected to the outlet 213 of the suction system 21. The powder that is stored in the suction system 21 and is located at the bottom of the suction system 21 can be extracted via the outlet 213 towards the metering system 27.

A valve 24 is located between the suction system 21 and the metering system 27. The valve 24 in the open configuration allows the passage of powder and the valve 24 in the closed configuration makes it possible to separate the suction system 21 from the metering system 27 in a sealed manner. When the suction system 21 is sucking in powder, the valve 24 is closed such that the suction occurs only at the inlet 211 and is directed towards the inside of the suction system 21. The closure of the valve 24 may be triggered automatically by starting to suck powder into the suction system 21.

The metering system 27 makes it possible to isolate an exact amount of powder from the powder stored in the metering system. This exact amount can be delivered to an outlet 271 of the metering system 27. The outlet 271 is located inside the housing 25 and has a valve 28. The valve 28 in the open configuration allows the passage of powder from the metering system 27 towards the inside of the housing 25 and the valve 28 in the closed configuration makes it possible to separate the metering system 27 from the inside of the housing 25 in a sealed manner.

The valve 28 is in particular closed when the first door 253 of the housing 25 is in the open position.

The metering system may be a metering screw, for example. The metering screw is contained in a barrel that extends in a direction which is conventionally a horizontal direction. When the screw is set in motion and powder is poured from the suction system 21 into the metering system 27 through the open valve 24, the powder is conveyed towards the outlet 271 by the screw in the direction in which the barrel extends.

The metering system may also be an air lock comprising two valves. The air lock has a predetermined volume, and makes it possible to isolate an exact volume of powder when it is filled with powder through the first valve located on the side of the suction system 21. The volume of powder can then be transferred to the housing 25 via the second valve located on the side of the housing 25.

The housing 25 may comprise a repotting area designed to receive a powder container below the outlet 271 of the metering system 27 on the inside of the housing 25.

The supply module 2 comprises a main hopper 29 which is located below the housing 25. The main hopper 29 is a container which allows additive manufacturing powder to be stored.

The main hopper 29 has a volume which has a frusto-conical shape and is designed for storing a large amount of manufacturing powder. The main hopper 29 is oriented such that the axis of the frustoconical shape is vertical and the volume of the frustoconical shape has a smaller horizontal cross section at the bottom of the hopper. The main hopper 29 has an outlet 293 located at the bottom of the main hopper.

The housing 25 comprises a second door 291 arranged between the chamber and the main hopper 29, movable between an open position, in which the powder located in the chamber can be transferred to the main hopper 29, and a closed position, in which the chamber is separated from the main hopper 29 in a sealed manner.

The second door 291 or isolation door 291 is for example an isolation valve 291. The second door 291 defines a passage between the housing and the main hopper that can be opened or closed hermetically in a controlled manner. The passage may be oriented vertically and wide enough for an operator to be able to empty the contents of a pot of powder from the housing 25 into the main hopper 29.

The supply module 2 comprises a diverter. The diverter comprises one inlet and two outlets.

The inlet of the diverter is the inlet of the metering system 27 and is connected to the outlet 213 of the suction system 21. The first outlet of the diverter is the outlet 271 of the metering system 27.

The second outlet of the diverter passes through the metering system 27 in a vertical direction. The second outlet may be in the continuation of the direction in which the powder poured from the suction system 21 arrives in the metering system 27. The second outlet is connected to a bypass circuit 31. The bypass circuit 31 directly connects the second outlet of the diverter and the main hopper 29. The bypass channel 31 may be oriented vertically and pass through the glovebox. The powder passing through the bypass circuit 31 does not reach any wall of the housing 25 and is not in direct contact with the atmosphere of the housing 25. In particular, if the valve 28 is closed, the powder passing through the bypass circuit 31 is not in contact with the atmosphere of the housing 25.

The second outlet is controlled by a valve 30. The valve 30 in the open configuration allows the passage of powder from the metering system 27 towards the bypass channel 31, and the valve 30 in the closed configuration prevents the passage of powder from the metering system 27 towards the bypass channel 31.

It is possible to configure the diverter in an extraction configuration, in which powder at the outlet of the metering system is directed selectively towards the glovebox 25. In this configuration, the valve 30 is in the closed configuration, and the metering screw is set in operation so as to convey powder towards the outlet 271 of the metering system.

It is possible to configure the diverter in a loopback configuration, in which powder at the outlet of the metering system 21 is directed selectively towards the second outlet of the diverter. In this configuration, the valve 30 is in the open configuration, and the metering screw is at a standstill.

The diverter can therefore be considered to be formed by the metering system 27 and the valve 30.

The supply module 2 comprises a metering device 33, located below the main hopper 29. The metering device 33 makes it possible to regulate the flow rate of powder sent to the sieve 35 in order to not damage a screen contained inside the sieve 35. The metering device 33 is connected to the outlet 293 of the main hopper. The metering device 33 has an outlet 331 located at the bottom of the metering device 33.

The supply module 2 comprises a sieve 35, located below the metering device 33. The sieve 35 is connected to the outlet 331 of the metering device 33. The sieve makes it possible to filter the agglomerated clumps of powder and to isolate them from the rest of the powder within a receptacle 351. The sieve comprises a third discharging circuit 353 which may comprise a vacuum pump for generating the suction force.

The supply module 2 comprises a reservoir 37 located below the sieve 35. The reservoir 37 may be a hopper having a volume which has a frustoconical shape designed for storing a large amount of manufacturing powder. This hopper may be oriented such that the axis of the frustoconical shape is vertical and the volume of the frustoconical shape has a smaller horizontal cross section at the bottom of the hopper. The reservoir 37 has an outlet 371 located at the bottom of the reservoir.

It is possible to transfer powder from the glovebox 25 to the reservoir 37 when the second door 291 is in the open position. The powder can then pass successively from the glovebox 25, to the main hopper 29, to the metering device 33, to the sieve 35 and then finally to the reservoir 37. In this way, it is possible to define a provisioning circuit configured to transfer powder located in the glovebox 25 to the main hopper 29 or, further along, to the reservoir 37. The second door 291 which defines a passage between the housing and the main hopper that can be opened or closed hermetically in a controlled manner can open or close the provisioning circuit.

The supply module 2 comprises a dry inert gas supply system 36. The supply system 36 can provide a stream of dry inert gas in a duct 352 connected to the sieve 35. The stream of dry inert gas passing through the duct 352 is oriented from the bottom upward so as to encounter powder passing through the sieve from the bottom upward. The stream of inert gas arriving in the sieve 35 via the duct 352 also diffuses into the upper part of the reservoir 37.

The duct 352 and the third discharging circuit 353 may be aligned in one and the same direction, such that a stream of inert gas, in one and the same direction, can pass successively through the duct 352, encounter powder passing through the sieve and finally pass through the third discharging circuit 353.

The supply system 36 can also provide a stream of dry inert gas in a duct 372 connected to the bottom of the reservoir 37, for example to the outlet 371.

The outlet 371 of the reservoir is connected to a return circuit 391. The return circuit 391 connects the outlet 371 of the reservoir 37 and the inlet 211 of the suction system 21. The return circuit 391 connects the outlet 371 of the reservoir 37 and the housing 25. It is possible to transport powder from the reservoir 37 towards the powder housing 25 via the suction system 21. The suction system 21 can suck in the powder from the reservoir 37 towards the suction system 21 through the return circuit 391.

The outlet 371 of the reservoir is also connected to a manufacturing duct 392. The manufacturing duct 392 connects the outlet 371 of the reservoir 37 and the manufacturing module 4, such that powder contained in the reservoir 37 can be transferred to the manufacturing module 4.

The sieve 35 is located just above the reservoir 37 such that the powder contained in the reservoir 37 and transferred to the manufacturing module 4 is sieved as late on as possible before being sent to the manufacturing module 4.

The reservoir 37 may have a smaller volume than the main hopper 29. The role of the reservoir 37 is to store the powder just before it is transported either to the manufacturing module 4 or to the suction system 21. The reservoir 37 can be referred to as a buffer hopper.

The main hopper 29 is designed to contain a large proportion of the manufacturing powder required for the additive manufacture of one or more three-dimensional objects. The powder contained in the main hopper 29 is intended to be transferred to the manufacturing module 4. To that end, the main hopper 29 is designed to be connected to the manufacturing module 4 configured to additively manufacture an object from the powder located in the main hopper 29. The main hopper 29 is connected to the manufacturing module by way of the circulation of powder passing through the metering device 33, the sieve 35, the reservoir or buffer hopper 37 and lastly the manufacturing duct 392.

The supply module 2 comprises a controller 39 which allows the powder to be diverted from the outlet 371 to the return circuit 391 or to the manufacturing duct 392.

The supply module 2 may comprise a moisture sensor 201 located on the first gas discharging circuit 23. This moisture sensor 201 makes it possible to know the level of humidity of the gases discharged by the suction system 21, that is to say the level of humidity upstream of the inlet 211 of the suction system 21.

The supply module 2 may comprise a moisture sensor 202 located on an upper part of the main hopper 29. This moisture sensor 202 makes it possible to know the level of humidity in the main hopper 29 and to provide information directly regarding the level of humidity of a powder possibly present in the main hopper 29.

The supply module 2 may comprise a moisture sensor 203 connected to the dry inert gas supply system 36. This moisture sensor 203 makes it possible to know the level of humidity of the dry inert gas sent to the sieve 35 or to the reservoir 37.

The supply module 2 comprises a circulation system comprising the suction system 21.

The suction system 21 can suck in the powder from the reservoir 37 towards the suction system 21 through the return circuit 391.

Manufacturing Module

In its upper part, the manufacturing module 4 comprises a second suction system 41 connected to a fourth gas discharging circuit 43. The second suction system 41 has an inlet 411 and an outlet 413 that is located at the bottom of the second suction system 41. The second suction system 41 is designed to generate a suction force at the inlet 411 that is directed towards the inside of the second suction system 41. The inlet 411 of the second suction system 41 is connected to the manufacturing duct 392. The fourth gas discharging circuit 43 may comprise a vacuum pump for generating the suction force. The second suction system 41 may comprise a powder filter so that the powder does not enter the fourth gas discharging circuit 43. The second suction system 41 comprises a device which makes it possible to separate the powder from the gas, such as for example a cyclone. Other devices for separating the powder from the gas do exist, such as a filter chamber comprising filters, a cyclofilter or a discharge box. The second suction system 41 is designed to receive additive manufacturing powder from the inlet 411 and to store it. The stored powder is located at the bottom of the second suction system 41 and can be extracted via the outlet 413.

The manufacturing module 4 comprises an air lock 45 located below the second suction system 41. The air lock 45 makes it possible to transfer powder without the printer chamber ever being in communication with the second suction system 41 so as to avoid disrupting the printing enclosure in terms of inerting and pressure.

The manufacturing module 4 comprises a divergent screw 47 and a convergent screw 51 that are located one on either side of an enclosure 49 within which the three-dimensional objects are manufactured. The enclosure 49 is the printer chamber.

The manufacturing module 4 comprises a powder recovery system for recovering the powder that has been spread and not consolidated at the end of manufacture.

The recovery system may comprise an aspiration tube 53 designed to suck in powder. The aspiration tube 53 comprises an aspiration nozzle 533 which constitutes the inlet of the aspiration tube. The powder is sucked in at the nozzle and transferred to the other end of the tube which constitutes the outlet of the aspiration tube 53. The manufacturing device 1 may comprise a first recovery duct 531 which connects the outlet of the aspiration tube 53 and the inlet 211 of the suction system 21.

The recovery system may comprise a surplus air lock 55 designed for recovering powder coming from the convergent screw 51.

The manufacturing device 1 may comprise a second recovery duct 551 which connects the surplus air lock 55 and the inlet 211 of the suction system 21.

The surplus air lock 55 makes it possible to transfer powder without the printer chamber ever being in communication with the second recovery duct 551 so as to avoid disrupting the printing enclosure in terms of inerting and pressure.

The manufacturing device 1 may also comprise a second controller designed to circulate the powder in a controlled manner from the recovery system towards the suction system 21.

In this regard, the inlet 211 may be referred to as an inlet of the supply module 2, which inlet is designed to be connected to the manufacturing module 4 and to receive powder located in the manufacturing module 4.

It should be noted that the manufacturing device 1 comprises enough valves at the intersections of ducts 391, 392, 531 and 551 to allow the powder circulations mentioned in the description.

It should also be noted that it is possible to transfer powder from the inlet 211 to the glovebox 25. The powder passes successively through the suction system 21, the outlet 213 of the suction system 21, the metering system 27, the diverter 27, 30 configured in its extraction configuration and lastly the glovebox 25. More specifically, the powder that arrives in the glovebox 25 can be poured into a container contained in the glovebox 25. Thus, there is an extraction circuit that is different from the provisioning circuit and is configured to transfer additive manufacturing powder from the inlet 211 of the supply module 2 to the container, when the container is received in the glovebox 25, the extraction circuit comprising the diverter 27, 30.

Method of Drying an Additive Manufacturing Powder

Initially, damp powder is in the main reservoir 37.

During a first step E1, the circulation system circulates the damp powder in a circulation loop.

It is possible to define a circulation loop in the supply module 2. The circulation loop passes through the main hopper 29, the sieve 35, the reservoir 37, the return circuit 391, the suction system 21, the bypass channel 31 and again the main hopper 29.

The inert gas supply circuit 372 connected at the top of the reservoir and at the bottom of the reservoir is activated so as to drive the unused powder into the return circuit 391. The suction system 21 is activated so as to generate a suction force at the inlet 211 that is directed towards the inside of the suction system 21. This setting in motion can be done in accordance with the various possible modes of transport: dense phase mode, dilute phase mode, etc. The powder concentration in the circulation ducts and the velocity of the gas stream can be controlled for this purpose.

On the one hand, the circulation system which makes it possible to set damp powder in motion and on the other hand the suction system which makes it possible to suck the moisture from the gaseous environment of the powder make it possible overall to dry the powder more quickly and more effectively. There is, during the period when the powder is circulated, an evacuation of air containing moisture and an injection of dry gas within the circulation loop. The evacuation of air containing moisture can in particular take place via the first discharging circuit 23 or the third discharging circuit 353.

Therefore, wet gas is extracted and replaced by dry gas in the circulation loop. The humidity of the gas and of the powder which are contained in the circulation loop therefore tends to decrease. Moreover, because the powder is set in motion, there is a dynamic contact between the grains of powder and the dry gas, and this tends to accelerate the drying of the powder.

No mobile mechanical element, such as a mixer, immersed inside a reservoir containing powder is used, and this means that the drying means do not disturb the correct operation of the additive manufacturing machine.

During a second step E2, one or more moisture sensors acquire a measurement so as to measure the level of humidity in the circulation loop.

The sensor 202 makes it possible to directly measure the level of humidity in the circulation loop at the level of the main hopper 29. In the case where a large volume of powder is contained in the main hopper, the moisture sensor 202 gives an indication which changes relatively slowly over time.

The sensors 201 and 203 make it possible to acquire a humidity measurement respectively on the first discharging circuit 23 of the suction system 21 and a humidity measurement on the inlet channel of the dry inert gas supply system 36. The combination of these measurements makes it possible to estimate the level of humidity in the circulation loop. The moisture sensors 201 and 203 can be used in combination and then give an indication of the humidity of the powder which has been circulated in the powder. This indication changes relatively quickly over time. On the other hand, in the case where a large volume of powder is contained in the supply module and in particular in the main hopper 29, the moisture sensors 201 and 203 only give an indication of the humidity of the fraction of the volume of powder which has been set in motion and provide only indirect information on the humidity of the powder as a whole.

The second step E2 makes it possible to monitor the evolution of the level of humidity in the circulation loop over time and to estimate whether or not it is necessary to continue the drying process.

During a third step E3, the measured level of humidity is compared with a threshold level. Typically, the threshold level is a level of humidity of the gaseous environment of the powder for which the powder set in motion in the circulation loop has a humidity sufficiently low enough for it to be used for manufacture. The threshold level may typically be equal to 5% relative humidity at a temperature of 25 degrees.

The step of making a comparison between the measured level of humidity and the threshold level can be performed by an operator or automatically by a control unit. The powder either is or is not set in motion depending on the result of this comparison step.

During a fourth step E4, the sieve sieves the powder put into circulation in the circulation loop. More specifically, the circulating powder arrives at the sieve and the sieve sifts the incoming powder.

The sieving step makes it possible to set the powder in motion and separate it in a dry gaseous atmosphere, which makes it possible to further accelerate the drying of the powder.

During a fifth step E5, the circulation system ends the movement of the powder in the circulation loop. Once the powder is judged to be sufficiently dry, the circulation of the powder is stopped. The result of the third comparison step E3 is therefore used to activate the fifth step. The third step E3 and the fifth step E5 make it possible to work with a precise quantitative threshold for ending the drying process.

The invention claimed is:

1. A supply module for supplying powder for additive manufacturing, the supply module comprising:

a main hopper for storing additive manufacturing powder, the main hopper being configured to be connected to a manufacturing module configured to additively manufacture an object from the powder located in the main hopper;

an inlet of the supply module, the inlet being configured to be connected to the manufacturing module and to receive powder located in the manufacturing module;

a glovebox configured to receive a container, the glovebox being configured to be closed in a sealed manner;

a provisioning circuit configured to transfer powder located in the glovebox to the main hopper; and a circulation system configured to set powder in motion according to a circulation loop that is closed and that circulates the powder, the circulation system comprising:

a suction system that is remote from the main hopper, the suction system being configured to evacuate gas present in the circulation loop, the circulation loop passing through the main hopper and the suction system;

a reservoir located below the main hopper, the reservoir comprising an outlet, the outlet being configured to be connected to a manufacturing duct, the manufacturing duct connecting the outlet of the reservoir and the manufacturing module; and a return circuit configured to redirect additive manufacturing powder located in the reservoir toward the inlet of the supply module, the return circuit connecting the outlet of the reservoir directly with the inlet of the supply module, wherein the circulation loop passes through the reservoir and the inlet of the supply module, and wherein the return circuit is different from the manufacturing duct.

2. The supply module according to claim 1, wherein the circulation system is configured to suck powder from the outlet of the reservoir toward the inlet of the supply module.

3. The supply module according to claim 2, further comprising a dry inert gas supply system configured to supply the circulation loop with dry inert gas below the main hopper.

4. The supply module according to claim 1, further comprising a moisture sensor configured to measure a level of humidity in the circulation loop.

5. The supply module according to claim 2, further comprising a sieve located above the reservoir.

6. The supply module according to claim 5, wherein the powder passing through the circulation loop successively passes through the main hopper, the sieve, the reservoir, the return circuit and the suction system, a first moisture sensor being configured to measure a level of humidity in the main hopper.

7. The supply module according to claim 4, wherein the moisture sensor is a first moisture sensor, and wherein the supply module further comprises:

a second moisture sensor placed on a gas evacuation circuit of the suction system; and a third moisture sensor connected to a dry inert gas supply system.

8. The supply module according to claim 1, further comprising:

an extraction circuit different from the provisioning circuit, the extraction circuit being configured to transfer to the container, when the container is received in the glovebox, additive manufacturing powder from the inlet of the supply module, the extraction circuit comprising a diverter; and a bypass circuit connecting the diverter to the reservoir and configured to transfer powder directly from the diverter to the reservoir, the diverter being configurable into:

an extraction configuration, in which additive powder coming from the inlet of the supply module is redirected selectively toward the glovebox, and a loopback configuration, in which additive powder coming from the inlet of the supply module is redirected selectively into the bypass circuit, wherein the diverter is configured in the loopback configuration when the circulation system is moving powder from the outlet of the reservoir toward an inlet of the manufacturing module.

9. An additive manufacturing device comprising:

the supply module for supplying additive manufacturing powder according to claim 1; and the manufacturing module configured to additively manufacture an object from the powder located in the main hopper, the main hopper being connected to the manufacturing module and the inlet of the supply module being connected to the manufacturing module.

10. The additive manufacturing device according to claim 9, wherein the manufacturing module comprises a recovery system for recovering unconsolidated powder that has not been consolidated during additive manufacturing of the object and for redirecting the unconsolidated powder, once recovered, toward the inlet of the supply module.

11. A method for drying additive manufacturing powder using the supply module according to claim 1, the method comprising:

when powder is present in the main hopper, a step of circulating the powder in the circulation loop using the circulation system.

12. The method according to claim 11, wherein the supply module further comprises a moisture sensor configured to measure a level of humidity in the circulation loop, and wherein the method further comprises:

a step of measuring the level of humidity in the circulation loop;

a step of comparing the measured level of humidity with a threshold level; and a step of stopping the circulation of the powder, the step of stopping the circulation being implemented according to a result of the step of comparing the measured level of humidity with the threshold level.

13. The method according to claim 11, wherein the supply module further comprises a moisture sensor configured to measure a level of humidity in the circulation loop and a sieve located above the reservoir, and wherein the method further comprises a step of sieving the powder put into circulation.

* * * * *